Patented Mar. 28, 1944

2,345,384

UNITED STATES PATENT OFFICE

2,345,384

POLY IODIZED DERIVATIVES OF THE HYDROXY DIPHENYL CARBOXYLIC ACIDS AND A PROCESS FOR PREPARING THE SAME

Max Dohrn, Berlin-Charlottenburg, and Paul Diedrich, Finkenkrug, Osthavelland, near Berlin, Germany, assignors to Schering Corporation, Bloomfield, N. J., a corporation of New Jersey No Drawing. Application April 6, 1940, Serial No. 328,236. In Germany May 20, 1939

4 Claims. (Cl. 260—520)

This invention relates to poly iodized derivatives of the hydroxy diphenyl carboxylic acids and a process for preparing the same.

Not only the known tetra iodo phenolphthalein but also iodized derivatives of 2-phenyl cinchonic acid (see U. S. Patent No. 1,846,321) have been employed for rendering visible the gall bladder by X-rays. All these compounds yield a good picture but they are not sufficiently indifferent physiologically on application in the necessary rather large amounts.

Now, the poly iodized derivatives of hydroxy diphenyl carboxylic acids represent lipoid-soluble compounds, which, contrary to the hitherto known contrast agents for the gall bladder combine a very good contrasting effect with an excellent compatibility. Said derivatives are made by iodizing o- or p-hydroxy diphenyl carboxylic acids by methods known per se.

We have found as most suitable contrast agents the iodized compounds of hydroxy diphenyl carboxylic acids of the general formula

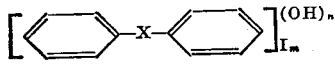

wherein X represents a member of the group consisting of the acetic acid radical and the radicals of homologues of acetic acid, while $n$ indicates the numerals 1 or 2 and $m$ the numerals 2 or 4, e. g. hydroxy diiodo diphenyl acetic acid, hydroxy- or dihydroxy diiodo diphenyl propionic or -butyric acids and others; as especially suitable there have proved 3,5-diiodo-4-hydroxy diphenyl acetic acid, and β-(4-hydroxy-3,5-diiodo phenyl)-α-phenyl propionic acid. The salts of these acids are capable of dissolving in water with neutral reaction.

The invention may be illustrated by the following examples without, however, being limited by them:

Example 1

To a solution of 22.8 grs. of 4-hydroxy diphenyl acetic acid in 400 ccs. of N-sodium hydroxide solution, a solution of 51 grs. of iodine and 51 grs. of potassium iodide in 500 ccs. of water is added drop by drop at room temperature while stirring. After the addition, stirring is continued for some time and then the iodized 4-hydroxy diphenyl acetic acid is precipitated by addition of sulfurous acid. The precipitate is removed by suction, washed with water and recrystallized from dilute alcohol. The 3,5-diiodo-4-hydroxy diphenyl acetic acid melts at 197° C. It is readily soluble in alcohol, acetone and ether, difficultly soluble in benzene and toluene, insoluble in chloroform and petrol ether.

Example 2

21 grs. of 2-hydroxy diphenyl acetic acid lactone (melting point 113-114° C.) are dissolved in 400 ccs. of N-sodium hydroxide solution and 250 ccs. of water. Then it is treated according to Example 1 with the same amount of iodine potassium iodide solution. On working up a product is obtained which on recrystallisation from dilute alcohol melts at 160° C. It represents pure 3,5-diiodo-2-hydroxy diphenyl acetic acid. Its solubility is similar to that of the p-derivative, described in Example 1.

Example 3

To a solution of 22.8 grs. of 4-hydroxy diphenyl acetic acid in 200 ccs. of N-sodium hydroxide solution and 300 ccs. of water a solution of 33 grs. of chlorine-iodine in 50 ccs. of a 30% hydrochloric acid and 450 ccs. of water is slowly added while stirring. Stirring is continued for several hours. Then the precipitate is separated, dissolved in dilute sodium hydroxide solution, filtered and the filtrate acidified, whereby 3,5-diiodo-4-hydroxy diphenyl acetic acid, melting at 197° C., is obtained.

Example 4

To a solution of 24.2 grs. of β-(4-hydroxy phenyl)-α-phenyl propionic acid in 800 ccs. of N/2-sodium hydroxide solution there is slowly added a solution of 50.8 grs. of iodine and 50.8 grs. of potassium iodide in 250 ccs. of water at room temperature while stirring. From the reaction mixture the iodized product is precipitated by addition of sulfurous acid and hydrochloric acid. After stirring for some time the precipitate is filtered off by suction and washed with water. After drying it is recrystallized from benzene with the aid of charcoal. The β-(4-hydroxy-3,5-diiodo phenyl)-α-phenyl propionic acid is obtained in the form of colourless prisms melting at 159° C. in a yield of 42 grs., corresponding to 85% of the theoretical yield. It is readily soluble in ether, alcohol and acetone, difficultly soluble in benzene, toluene and chloroform, insoluble in water and petrol ether.

Example 5

24.2 grs. of β-(4-hydroxy phenyl)-β-phenyl propionic acid are iodized according to Example 4. By recrystallisation from benzene the β-(4- hydroxy-3,5-diiodo phenyl)-β-phenyl propionic acid is obtained forming colourless needles melting at 171-172° C. Its solubility is similar to that of the compound, described in Example 4.

Example 6

24.2 grs. of α-(4-hydroxy phenyl)-α-phenyl propionic acid of M. P.=150° C., prepared by condensation of methyl mandelic acid and phenol by means of 73% sulfuric acid, are iodized according to Example 4. The α-(4-hydroxy-3,5-diiodo phenyl)-α-phenyl propionic acid is obtained, which forms a crystalline colourless powder, melting at 183-184° C., when twice recrystallized from benzene. Its solubility is similar to that of its isomers, described above.

Example 7

25.6 grs. of γ-(4-hydroxy phenyl)-β-phenyl butyric acid of M. P.=135° C., prepared by condensation of dihydro cinnamic acid with 4-hydroxy benzaldehyde in the presence of acetic acid anhydride and hydrogenation of the benzylidene compound having a melting point of 189° C., by means of sodium amalgam, are iodized according to Example 4. The crude reaction product is recrystallized from a mixture of chloroform and petrol ether. The γ-(4-hydroxy-3,5-diiodophenyl)-β-phenyl butyric acid thus obtained melts at 140-141° C.

Example 8

25.8 grs. of 4,4'-dihydroxy diphenyl propionic acid, prepared by condensation of 4-hydroxy phenyl acetic acid and 4-hydroxy benzaldehyde and hydrogenation of the benzylidene compound melting at 200° C., by means of sodium amalgam, are dissolved in 700 ccs. of a N-sodium hydroxide solution. A solution of 101.6 grs. of iodine and 101.6 grs. of potassium iodide in 500 ccs. of water is slowly added thereto at room temperature while stirring. By acidifying with sulfurous acid and hydrochloric acid the reaction product is precipitated quantitatively. It is separated, washed and dried and then recrystallized from benzene with addition of a small amount of alcohol. The 4,4'-dihydroxy-3,3',5,5'-tetraiodo-α,β-diphenyl propionic acid forms microscopic crystals melting at 206° C. with decomposition. It is readily soluble in alcohol and acetone, difficultly in benzene and insoluble in petrol ether and chloroform.

Of course, many changes and variations may be made in the reaction conditions, the solvents used, the reagents employed and the like. Thus, for instance, instead of the iodizing methods used in the examples also other methods may be employed as they are described, for instance, in Houben "Die Methoden der organischen Chemie" 3rd edition, vol. 3, pages 1169 ff.; especially suitable are those methods whereby hydrogen is substituted by iodine.

For using the compounds described and claimed as X-ray contrast agents for rendering visible the gall bladder, they are preferably employed in the form of chocolate-covered granules. 3 grs. of these are usually sufficient in order to give excellent X-ray pictures of the gall bladder 12-14 hours after application. Of course, the contrast agents may also be administered in another form, for example, in the form of tablets or the like. Furthermore salt solutions of the acids may be used likewise.

All these changes and variations that may be made by those skilled in the art must comply with the requirements of the principles set forth herein and in the claims annexed hereto.

By the expression "trivalent hydrocarbon residue of an acid of the acetic acid series" as employed in the claims is to be understood the radical of the acid minus the —COOH group; such residue being trivalent by reason of the fact that it is joined to the two phenyl radicals as well as to the —COOH group.

What we claim is:

1. The 3,5-diiodo-4-hydroxy diphenyl acetic acid melting at 197° C.
2. The β-(4-hydroxy-3,5-diiodophenyl)-α-phenyl propionic acid melting at 159° C.
3. The β-(4-hydroxy-3,5-diiodophenyl)-β-phenyl propionic acid melting at 171-172° C.
4. Polyiodo derivatives of hydroxy diphenyl carboxylic acids of the formula

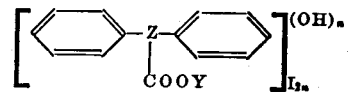

wherein Z is a trivalent hydrocarbon residue of an acid of the acetic acid series, and Y is a member of the class consisting of hydrogen and alkali metals, n being an integer having a maximum value of 2, there being no more than one hydroxyl group on either phenyl radical, and the iodine occupying the 3 and 5 positions of a phenyl radical having a hydroxyl group, said hydroxyl group being in ortho position to an iodine atom.

MAX DOHRN.
PAUL DIEDRICH.